US010457260B2

(12) United States Patent
Yoshida

(10) Patent No.: US 10,457,260 B2
(45) Date of Patent: Oct. 29, 2019

(54) VEHICLE BRAKE CONTROL DEVICE

(71) Applicant: Advics Co., Ltd., Kariya-shi, Aichi-ken (JP)

(72) Inventor: Kazuaki Yoshida, Nagoya (JP)

(73) Assignee: ADVICS CO., LTD., Kariya-shi, Aichi-ken (JP)

( * ) Notice: Subject to any disclaimer, the term of this patent is extended or adjusted under 35 U.S.C. 154(b) by 0 days.

(21) Appl. No.: 15/760,040

(22) PCT Filed: Sep. 29, 2016

(86) PCT No.: PCT/JP2016/078930
§ 371 (c)(1),
(2) Date: Mar. 14, 2018

(87) PCT Pub. No.: WO2017/061327
PCT Pub. Date: Apr. 13, 2017

(65) Prior Publication Data
US 2018/0251113 A1   Sep. 6, 2018

(30) Foreign Application Priority Data
Oct. 9, 2015   (JP) .................................. 2015-201140

(51) Int. Cl.
*B60T 13/52* (2006.01)
*B60T 8/44* (2006.01)
(Continued)

(52) U.S. Cl.
CPC .............. *B60T 13/52* (2013.01); *B60T 7/042* (2013.01); *B60T 8/00* (2013.01); *B60T 8/3275* (2013.01);
(Continued)

(58) Field of Classification Search
CPC ...... B60T 13/52; B60T 13/166; B60T 13/662; B60T 13/686; B60T 8/00; B60T 8/444; B60T 8/3275; B60T 7/042
See application file for complete search history.

(56) References Cited

U.S. PATENT DOCUMENTS

| | | | |
|---|---|---|---|
| 6,254,202 B1 * | 7/2001 | Kawamoto | ............... B60T 7/22 303/116.2 |
| 2010/0117445 A1 * | 5/2010 | Kato | ....................... B60T 7/042 303/11 |

(Continued)

FOREIGN PATENT DOCUMENTS

| | | | | |
|---|---|---|---|---|
| JP | 2010116048 A | * | 5/2010 | .............. B60T 7/042 |
| JP | 2011-111125 A | | 6/2011 | |
| JP | 2011-121535 A | | 6/2011 | |

OTHER PUBLICATIONS

English Machine Translation of JP-2010116048A (Year: 2010).*
(Continued)

*Primary Examiner* — Melody M Burch
(74) *Attorney, Agent, or Firm* — Buchanan Ingersoll & Rooney PC

(57) ABSTRACT

Provided is a vehicle brake control device which is capable of suitably executing brake assistance processing, even if a sensor for detecting the pressure inside a variable-pressure chamber of a vacuum booster is not provided. A brake device is provided with: a vacuum booster for assisting an operation force inputted to a brake pedal; a master cylinder which generates MC pressure Pmc corresponding to the assisted operation force; wheel cylinders which are provided to wheels, and in which WC pressure is increased as the MC pressure Pmc is increased; and a brake actuator capable of adjusting the WC pressure. When it is determined that emergency braking is requested, a control device of the brake device sets, as the assistance limit pressure, the MC (Continued)

pressure Pmc at that point in time, and operates the brake actuator, to execute brake assistance processing for assisting WC pressure increase.

4 Claims, 7 Drawing Sheets

(51) Int. Cl.
*B60T 8/00* (2006.01)
*B60T 7/04* (2006.01)
*B60T 8/32* (2006.01)
*B60T 13/16* (2006.01)
*B60T 13/66* (2006.01)
*B60T 13/68* (2006.01)

(52) U.S. Cl.
CPC ............ *B60T 8/444* (2013.01); *B60T 13/166* (2013.01); *B60T 13/662* (2013.01); *B60T 13/686* (2013.01)

(56) References Cited

U.S. PATENT DOCUMENTS

| | | | |
|---|---|---|---|
| 2010/0161191 A1* | 6/2010 | Kato | B60T 8/442 701/70 |
| 2012/0049615 A1 | 3/2012 | Tomida et al. | |
| 2012/0074770 A1* | 3/2012 | Lee | B60T 8/172 303/20 |
| 2015/0097416 A1* | 4/2015 | Ueura | B60T 7/042 303/3 |

OTHER PUBLICATIONS

International Search Report (PCT/ISA/210) dated Dec. 20, 2016, by the Japanese Patent Office as the International Searching Authority for International Application No. PCT/JP2016/078930.

Written Opinion (PCT/ISA/237) dated Dec. 20, 2016, by the Japanese Patent Office as the International Searching Authority for International Application No. PCT/JP2016/078930.

\* cited by examiner

VEHICLE BRAKE CONTROL DEVICE

TECHNICAL FIELD

The present invention relates to a vehicle brake control device which performs brake assistance processing for assisting an increase in hydraulic pressure in a wheel cylinder provided for a wheel when brake operation is performed by a driver.

BACKGROUND ART

A vacuum booster provided on a vehicle brake device includes a negative pressure chamber and a variable pressure chamber connected to an intake pipe of an engine and a vacuum pump. The variable pressure chamber communicates with the negative pressure chamber when the brake operation is not performed, and is opened to atmosphere when the brake operation is performed with the communication with the negative pressure chamber blocked. Therefore, when the brake operation is performed, pressure in the variable pressure chamber is increased by atmospheric air flowing into the variable pressure chamber, and differential pressure between the negative pressure chamber and the variable pressure chamber increases. Then, the vacuum booster utilizes the differential pressure to assist brake operation force being operation force of a brake pedal by the driver.

Incidentally, in a case where the brake operation is performed in a situation in which negative pressure in the negative pressure chamber is low, the above-described differential pressure is less likely to increase. Also, in a case where an operating speed of the brake pedal by the driver is high, that is, in a case where the driver who performs the brake operation requests emergency braking, the pressure in the variable pressure chamber might tend to decrease and the above-described differential pressure might become small. When the above-described differential pressure does not increase in this manner, assisting force by the vacuum booster is less likely to increase.

Therefore, the brake control device disclosed in Patent Literature 1 starts the brake assistance processing for assisting the increase in hydraulic pressure in the wheel cylinder provided for the wheel earlier as the operating speed of the brake pedal is higher. As a result, even in a case where the operating speed of the brake pedal is high and the pressure in the variable pressure chamber is decreased, it is possible to assist the increase in brake force applied to the vehicle before the vacuum booster reaches assistance limit. Meanwhile, the "assistance limit" herein means a state in which the increase in the assisting force by the vacuum booster cannot follow the increase in operation force of the brake pedal by the driver.

Herein, an example of the brake assistance processing performed when the vacuum booster reaches the assistance limit is described. That is, when the brake pedal is operated by the driver, the negative pressure in the negative pressure chamber is monitored, the hydraulic pressure in the master cylinder at a point in time when the vacuum booster reaches the assistance limit is predicted from the negative pressure, and a predicted value is made a negative pressure conversion hydraulic pressure. Meanwhile, the negative pressure conversion hydraulic pressure is calculated using a map prepared in advance, and the negative pressure conversion hydraulic pressure increases as the negative pressure in the negative pressure chamber is higher.

When a start condition of the brake assistance processing is satisfied, the negative pressure conversion hydraulic pressure at that point in time is recognized as assistance limit pressure, and target hydraulic pressure is set on the basis of the assistance limit pressure. For example, target hydraulic pressure F1 may be represented by the following relational expression (equation 1). Meanwhile, in relational expression (equation 1), "Pmc" represents the hydraulic pressure in the master cylinder, "Pmb" represents the assistance limit pressure, and "Gadj" represents a predetermined correction gain. For example, the predetermined correction gain Gadj may be set to a gain when the brake operation ideal in terms of a design of the vacuum booster is performed.

[Expression 1]

$$F1 = Pmc + Gadj \cdot (Pmc - Pmb) \quad \text{(Equation 1)}$$

Then, a difference obtained by subtracting a current MC pressure Pmc in the master cylinder from the target hydraulic pressure F1 calculated in this manner becomes the target increase amount, and a brake actuator is operated according to the target increase amount. As a result, the hydraulic pressure in the wheel cylinder may be brought closer to the target hydraulic pressure.

CITATIONS LIST

Patent Literature

Patent Literature 1: Japanese Unexamined Patent Application Publication No. 2011-121535
Patent Literature 2: Japanese Unexamined Patent Application Publication No. 2011-111125

SUMMARY OF INVENTION

Technical Problems

Meanwhile, in the brake control device disclosed in Patent Literature 1, the execution of the brake assistance processing may be started before the vacuum booster reaches the assistance limit even in a case where the operating speed of the brake pedal by the driver is high; however, no specific setting method of start timing of the processing is disclosed.

As a method of starting the brake assistance processing at appropriate timing, for example, as disclosed in Patent Literature 2, the method of monitoring the pressure in the variable pressure chamber of the vacuum booster, and starting the brake assistance processing when a decrease in pressure in the variable pressure chamber is detected is also known. In this case, although it is possible to make the start timing of the brake assistance processing appropriate, it is necessary to provide a pressure sensor for the variable pressure chamber which is not generally provided in the vacuum booster.

An object of the present invention is to provide the vehicle brake control device capable of appropriately performing the brake assistance processing even in a case where the sensor which detects the pressure in the variable pressure chamber of the vacuum booster is not provided.

Solutions to Problems

A vehicle brake control device for solving the above-described problem includes a vacuum booster which assists operation force inputted to a brake operating member in accordance with differential pressure between a negative pressure chamber and a variable pressure chamber when the brake operating member is operated, a master cylinder in which hydraulic pressure corresponding to the operation force assisted by the vacuum booster is generated, a wheel cylinder provided for a wheel in which inner hydraulic pressure increases as the hydraulic pressure in the master cylinder increases, and a brake adjusting mechanism configured to be able to adjust the hydraulic pressure in the wheel cylinder even when the brake operating member is not operated. The vehicle brake control device is applied to a vehicle in which brake force applied to the vehicle is increased by an increase in hydraulic pressure in the wheel cylinder. The vehicle brake control device is based on a device provided with an assistance control unit which performs brake assistance processing of increasing the hydraulic pressure in the wheel cylinder by a target increase amount based on assistance limit pressure by allowing the brake adjusting mechanism to operate when the vacuum booster reaches assistance limit in a situation in which the brake operating member is operated. The vehicle brake control device is provided with a target increase amount setting unit which, when determining that emergency braking is requested from an operation mode of the brake operating member, makes the hydraulic pressure in the master cylinder at that point in time the assistance limit pressure and sets the target increase amount based on the assistance limit pressure. The assistance control unit performs the brake assistance processing when it is determined that the emergency braking is requested.

When the operating speed of the brake operating member by the driver is high, the pressure in the variable pressure chamber of the vacuum booster easily decreases, and the vacuum booster easily reaches the assistance limit. Therefore, in the above-described configuration, when it is determined that the emergency braking is requested, the hydraulic pressure in the master cylinder at that point in time is made the assistance limit pressure, and the brake assistance processing is started to increase the hydraulic pressure in the wheel cylinder by the target increase amount based on the assistance limit pressure. As a result, the brake adjusting mechanism may be operated before the vacuum booster reaches the predicted assistance limit, and the brake operation by the driver may be appropriately assisted. Therefore, even in a case where the sensor which detects the pressure in the variable pressure chamber of the vacuum booster is not provided, the brake assistance processing may be appropriately performed.

Meanwhile, in a case where the hydraulic pressure in the master cylinder at a point in time when the vacuum booster reaches the assistance limit predicted from the negative pressure in the negative pressure chamber is made negative pressure conversion hydraulic pressure, the negative pressure conversion hydraulic pressure increases as the negative pressure in the negative pressure chamber is higher. Therefore, when the negative pressure in the negative pressure chamber is lowered by the brake operation by the driver, the negative pressure conversion hydraulic pressure decreases; however, at a point in time when it is determined that the emergency braking is requested, the negative pressure conversion hydraulic pressure is higher than the hydraulic pressure in the master cylinder (that is, the assistance limit pressure) at the same point in time.

The vehicle brake control device described above may also be provided with a target hydraulic pressure setting unit which increases target hydraulic pressure as a difference obtained by subtracting the assistance limit pressure from the negative pressure conversion hydraulic pressure at a point in time when it is determined that the emergency braking is requested is larger. In this case, the target increase amount setting unit preferably sets a difference obtained by subtracting the hydraulic pressure in the master cylinder from the target hydraulic pressure set by the target increase amount setting unit as the target increase amount.

According to the above-described configuration, as assistance efficiency by the vacuum booster at the point in time when the emergency braking is determined is predicted to be low, the assistance limit pressure which is the hydraulic pressure in the master cylinder at that point in time decreases and the target hydraulic pressure is likely to increase. When the target hydraulic pressure is high in this manner, the target increase amount increases, and an increase amount of the hydraulic pressure in the wheel cylinder due to the operation of the brake adjusting mechanism associated with the execution of the brake assistance processing increases. Therefore, the assistance of the brake operation by the driver may be appropriately performed according to the assistance efficiency by the vacuum booster.

Also, in the vehicle brake control device described above, the target hydraulic pressure setting unit preferably corrects to decrease the target hydraulic pressure when the negative pressure in the negative pressure chamber increases in a situation in which the brake assistance processing is performed.

According to the above-described configuration, when the operating speed of the brake operating member by the driver decreases and the negative pressure in the negative pressure chamber does not decrease any more, the negative pressure eventually increases (recovers), and the assistance efficiency by the vacuum booster starts becoming higher, so that the target hydraulic pressure is corrected to decrease. Then, the target increase amount which is the difference obtained by subtracting the hydraulic pressure in the master cylinder from the target hydraulic pressure is decreased. Then, the brake assistance processing is performed based on the target increase amount, so that the increase amount of the hydraulic pressure in the wheel cylinder by the operation of the brake adjusting mechanism becomes small. Therefore, as compared with a case where the target hydraulic pressure is maintained even when the assistance efficiency starts increasing, a gap between requested deceleration being the deceleration intended by the driver who operates the brake operating member and actual vehicle deceleration may be suppressed.

In addition, in the above-described vehicle brake control device, the target increase amount setting unit preferably decreases the target increase amount as an operating speed of the brake operating member at a point in time when it is determined that the emergency braking is requested is lower and decreases the target increase amount as the negative pressure in the negative pressure chamber at the same point in time is higher. According to this configuration, even in a case where the emergency braking is requested, when the operating speed of the brake operating member by the driver is low, a decreasing speed of the pressure in the variable pressure chamber tends to decrease and it is possible to determine that the assistance efficiency by the vacuum booster does not decrease so much, so that the target increase amount tends to be small.

Due to a configuration in which the vacuum booster utilizes differential pressure between the variable pressure chamber and the negative pressure chamber, the higher the negative pressure in the negative pressure chamber is, the more the assistance efficiency by the vacuum booster tends to increase. In this respect, with the above-described configuration, the target increase amount tends to decrease as the negative pressure in the negative pressure chamber at the point in time when the emergency braking is determined is higher.

By setting the target increase amount while taking into account the operating speed of the brake operating member at the point in time when the emergency braking is determined and the negative pressure in the negative pressure chamber, and by operating the brake adjusting mechanism on the basis of the target increase amount, it is possible to suppress the excessive assistance of the brake operation by the driver.

For example, there is a case where the above-described vehicle brake control device is provided with an initial gain setting unit which sets a correction initial gain on the basis of the operating speed of the brake operating member at the point in time when it is determined that emergency braking is requested and on the basis of the negative pressure conversion hydraulic pressure at the same point in time, and a target hydraulic pressure setting unit which calculates a correction gain on the basis of the set correction initial gain, multiplies the correction gain by a difference obtained by subtracting the assistance limit pressure from the hydraulic pressure in the master cylinder, and makes a sum of a product and the assistance limit value a target hydraulic pressure. In this case, it is preferable that the initial gain setting unit decreases the correction initial gain as the operating speed of the brake operating member at the point in time when it is determined that the emergency braking is requested is lower and as the negative pressure conversion hydraulic pressure at the same point in time is higher, and the target increase amount setting unit makes a difference obtained by subtracting the hydraulic pressure in the master cylinder from the target hydraulic pressure set by the target increase amount setting unit the target increase amount. By deriving the target increase amount in this manner, it is possible to realize a configuration in which the target increase amount is decreased as the operating speed of the brake operating member at the time of the emergency braking determination is lower, and as the negative pressure in the negative pressure chamber (that is, the negative pressure conversion hydraulic pressure) at the same time is higher.

Also, in the above-described vehicle brake control device, it is preferable that the target hydraulic pressure setting unit corrects to increase the correction gain when the negative pressure in the negative pressure chamber increases in a situation in which the brake assistance processing is performed and calculates the target hydraulic pressure by using the correction gain corrected to increase. According to this configuration, by increasing the correction gain, the difference obtained by subtracting the hydraulic pressure in the master cylinder from the target hydraulic pressure decreases. Then, by making the difference the target increase amount, it is possible to make the target increase amount smaller when the negative pressure in the negative pressure chamber increases even in a case where it is during execution of the brake assistance processing and the operation of the brake operating member by the driver is continued. Therefore, as compared with a case where the target increase amount is maintained even when assistance efficiency starts increasing, a gap between the requested deceleration which is the deceleration intended by the driver who operates the brake operating member and actual vehicle deceleration may be suppressed.

BRIEF DESCRIPTION OF DRAWINGS

FIG. 3(a) illustrates a transition of pressure in a variable pressure chamber and pressure in a negative pressure chamber of the vacuum booster, and FIG. 3(b) illustrates a transition of the brake operation force inputted to the brake pedal.

FIG. 7(a) illustrates a transition of hydraulic pressure or the like in a master cylinder, FIG. 7(b) illustrates a transition of negative pressure in the negative pressure chamber, FIG. 7(c) illustrates a transition of the target increase amount, FIG. 7(d) illustrates a transition of the brake operation force, and FIG. 7(e) illustrates timing when it is determined that emergency braking is requested.

DESCRIPTION OF EMBODIMENTS

First Embodiment

Hereinafter, a first embodiment embodying a vehicle brake control device is described with reference to FIGS. 1 to 7.

Figure 1:
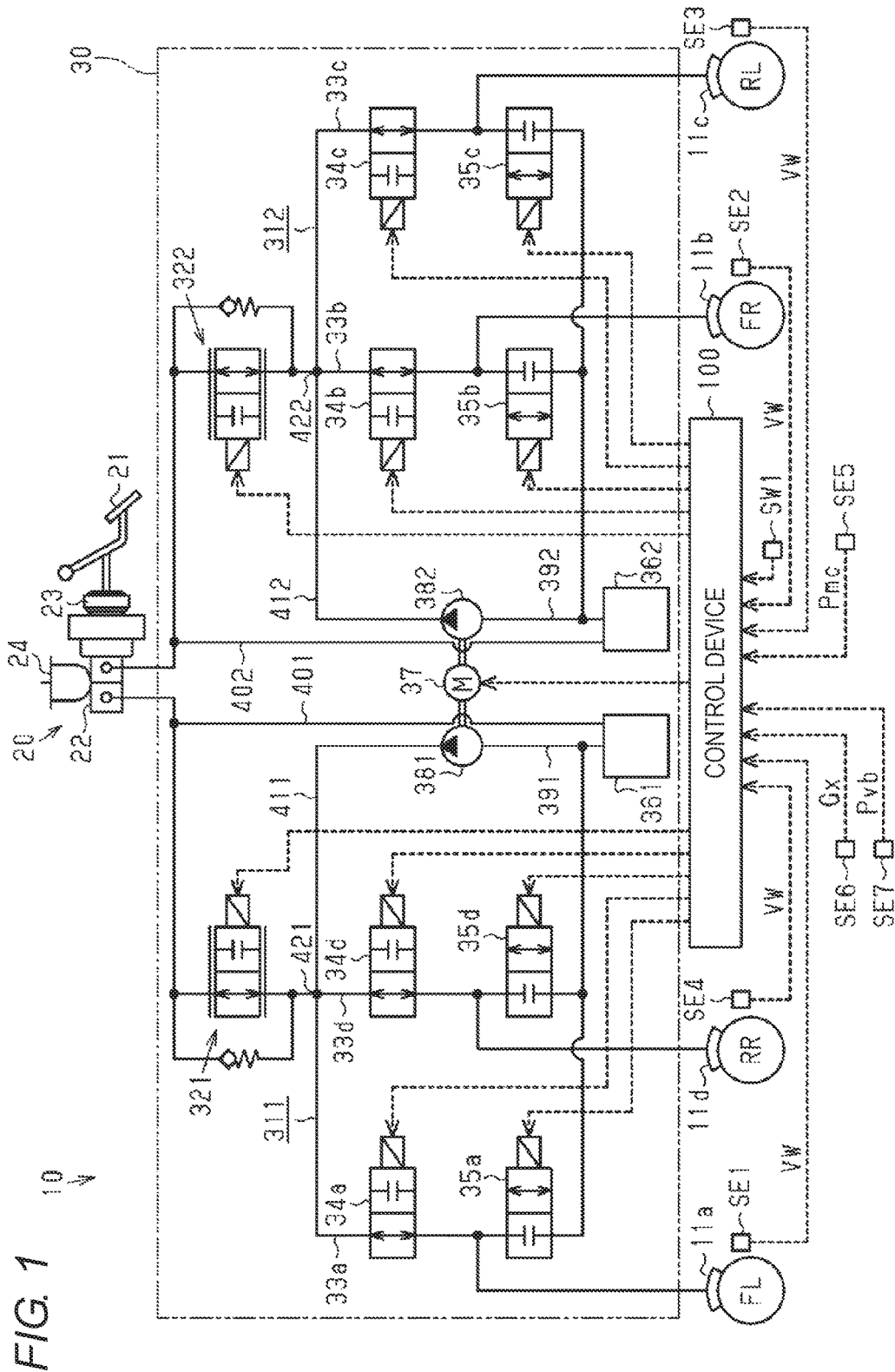
FIG. 1 is a configuration diagram schematically illustrating a brake device provided with a control device which is a first embodiment of a vehicle brake control device.

FIG. 1 illustrates an example of a brake device 10 provided with a control device 100 which is a vehicle brake control device of this embodiment. As illustrated in FIG. 1, a vehicle provided with the brake device 10 is provided with a plurality of wheels FL, FR, RL, and RR and a plurality of wheel cylinders 11a, 11b, 11c, and 11d corresponding to the wheels FL, FR, RL, and RR, respectively. Brake fluid is supplied from the brake device 10 to the wheel cylinders 11a to 11d, so that hydraulic pressure in the wheel cylinders 11a to 11d is increased. As a result, brake force according to the hydraulic pressure in the wheel cylinders 11a to 11d is applied to the wheels FL, FR, RL, and RR. Meanwhile, the hydraulic pressure in the wheel cylinders 11a to 11d is also referred to as "WC pressure".

The brake device 10 includes a hydraulic pressure generating device 20 which generates hydraulic pressure according to operation force of a brake pedal 21 by a driver and a brake actuator 30 capable of individually adjusting the WC pressure in each of the wheel cylinders 11a to 11d. Meanwhile, in this specification, operation of the brake pedal 21 by the driver is sometimes referred to as "brake operation", and the operation force of the brake pedal 21 is sometimes referred to as "brake operation force".

The hydraulic pressure generating device 20 is provided with a master cylinder 22, a vacuum booster 23 which assists the brake operation force inputted to the brake pedal 21, and an atmospheric pressure reservoir 24 in which the brake fluid is reserved. The brake operation force is inputted to the master cylinder 22 through the vacuum booster 23. Then, in the master cylinder 22, hydraulic pressure according to the inputted brake operation force is generated. Meanwhile, such hydraulic pressure in the master cylinder 22 is also referred to as "MC pressure".

In the brake actuator 30, two systems of hydraulic pressure circuits 311 and 312 are provided. The wheel cylinder 11a for a left front wheel and the wheel cylinder 11d for a right rear wheel are connected to the first hydraulic pressure circuit 311, and the wheel cylinder 11b for a right front wheel and the wheel cylinder 11c for a left front wheel are connected to the second hydraulic pressure circuit 312. When the brake fluid flows from the hydraulic pressure generating device 20 into the first and second hydraulic pressure circuits 311 and 312, the brake fluid is supplied to the wheel cylinders 11a to 11d.

Differential pressure adjusting valves 321 and 322 which are linear solenoid valves are provided on a fluid path connecting the master cylinder 22 to the wheel cylinders 11a to 11d. In the first hydraulic pressure circuit 311, a route 33a for the left front wheel and a route 33d for the right rear wheel are provided on a side closer to the wheel cylinders 11a and 11d than the differential pressure adjusting valve 321. Similarly, in the second hydraulic pressure circuit 312, a route 33b for the right front wheel and a route 33c for the left rear wheel are provided on a side closer to the wheel cylinders 11b and 11c than the differential pressure adjusting valve 322. On these routes 33a to 33d, holding valves 34a, 34b, 34c, and 34d being normally-open solenoid valves which operate when an increase in WC pressure in the wheel cylinders 11a to 11d is regulated and pressure reducing valves 35a, 35b, 35c, and 35d being normally-closed solenoid valves which operate when the WC pressure is decreased.

Reservoirs 361 and 362 which temporarily reserve the brake fluid flowing out from the wheel cylinders 11a to 11d through the pressure reducing valves 35a to 35d, and supply pumps 381 and 382 operating on the basis of driving of the motor 37 are connected to the first and second hydraulic pressure circuits 311 and 312, respectively. The reservoirs 361 and 362 are connected to the supply pumps 381 and 382 through suction flow paths 391 and 392 and also connected to the route on a side closer to the master cylinder 22 than the differential pressure adjusting valves 321 and 322 through master side flow paths 401 and 402, respectively. Also, the supply pumps 381 and 382 are connected to connecting points 421 and 422 between the differential pressure adjusting valves 321 and 322 and the holding valves 34a to 34d through supply flow paths 411 and 412, respectively.

When the motor 37 drives, the supply pumps 381 and 382 pump the brake fluid from the reservoirs 361 and 362 and the master cylinder 22 through the suction flow paths 391 and 392 and the master side flow paths 401 and 402, and discharge the brake fluid to the supply flow paths 411 and 412, respectively. That is, by operation of the differential pressure adjusting valves 321 and 322 and the supply pumps 381 and 382, differential pressure is generated between the master cylinder 22 and the wheel cylinders 11a to 11d, and the brake force corresponding to the differential pressure is applied to the vehicle. Therefore, in this specification, the brake actuator 30 forms an example of a "brake adjusting mechanism" configured to be able to adjust the brake force applied to the vehicle even when the brake pedal 21 is not operated.

As illustrated in FIG. 1, the vehicle provided with this brake device 10 is provided with a brake switch SW1, wheel speed sensors SE1, SE2, SE3, and SE4 as many as the wheels FL, FR, RL, and RR, a pressure sensor SE5, a longitudinal direction acceleration sensor SE6, and a negative pressure sensor SE7. The brake switch SW1 detects whether the brake pedal 21 is operated. The wheel speed sensors SE1 to SE4 detect a wheel speed VW of the corresponding wheels FL, FR, RL, and RR. The pressure sensor SE5 detects MC pressure Pmc in the master cylinder 22. The longitudinal direction acceleration sensor SE6 detects longitudinal direction acceleration Gx of the vehicle. The negative pressure sensor SE7 detects negative pressure Pvb in a negative pressure chamber 51 of the vacuum booster 23 to be described later. Then, information detected by these detection systems is inputted to the control device 100.

The control device 100 is provided with a microcomputer and a driving circuit for driving various valves and the motor 37. The control device 100 controls the brake actuator 30, that is, the motor 37 and the various valves 321 and 322, 34a to 34d, and 35a to 35d on the basis of the information inputted from the detection system.

Figure 2:
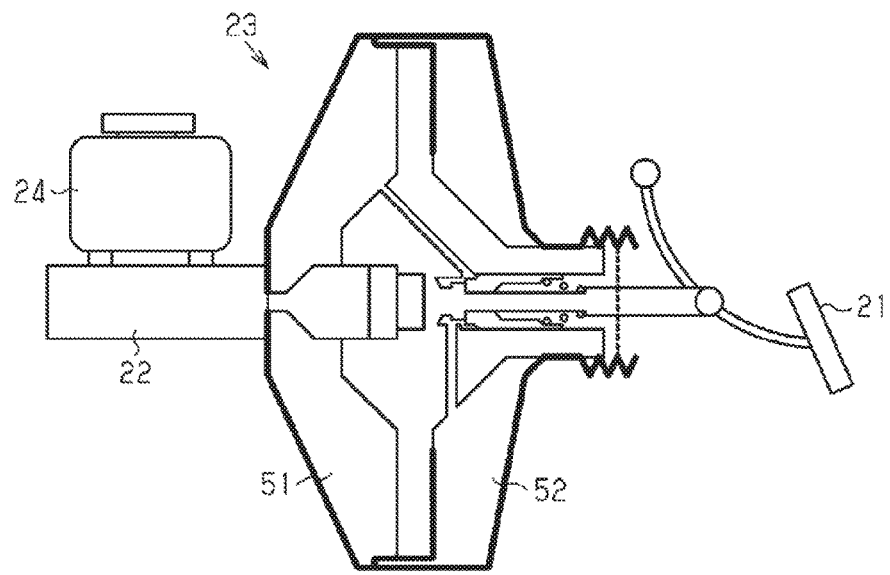
FIG. 2 is a configuration diagram schematically illustrating a vacuum booster provided on the brake device.

Next, the vacuum booster 23 is described with reference to FIG. 2. FIG. 2 schematically illustrates a state of the vacuum booster 23 when the brake operation is not performed by the driver.

As illustrated in FIG. 2, the vacuum booster 23 is provided with the negative pressure chamber 51 and a variable pressure chamber 52. An intake pipe of an engine, for example, is connected to the negative pressure chamber 51. Therefore, when the engine is in operation, the inside of the negative pressure chamber 51 is at negative pressure. That is, a difference obtained by subtracting the pressure in the negative pressure chamber 51 from atmospheric pressure is detected as the negative pressure Pvb by the negative pressure sensor SE7. Meanwhile, in a case of the engine such as a diesel engine in which the negative pressure is less likely to increase in the intake pipe, the vacuum pump might be connected to the negative pressure chamber 51.

When the driver does not perform the brake operation, the variable pressure chamber 52 communicates with the negative pressure chamber 51. Therefore, when a state in which the brake operation is not performed is continued, the pressure in the variable pressure chamber 52 becomes substantially equal to the pressure in the negative pressure chamber 51. That is, the inside of the variable pressure chamber 52 is at the negative pressure. When the brake operation is performed by the driver, the communication between the variable pressure chamber 52 and the negative pressure chamber 51 is blocked, the variable pressure chamber 52 communicates with the outside, and atmospheric air flows into the variable pressure chamber 52 from the outside. Then, since the pressure in the variable pressure chamber 52 approaches the atmospheric pressure, the differential pressure between the variable pressure chamber 52 and the negative pressure chamber 51 increases. As a result, the vacuum booster 23 assists the brake operation force inputted to the brake pedal 21 by the driver. Then, the brake operation force assisted in this manner is inputted to the master cylinder 22, and the MC pressure Pmc corresponding to the inputted brake operation force is generated in the master cylinder 22.

Meanwhile, the differential pressure between the variable pressure chamber 52 and the negative pressure chamber 51 becomes the maximum when the pressure in the variable pressure chamber 52 becomes equal to the atmospheric pressure. When the differential pressure becomes the maximum in this manner, assisting force by the vacuum booster 23 also becomes maximum, and even if the above-described brake operation force is increased, the assisting force does not become larger any more.

When the brake operation is finished after that, the variable pressure chamber 52 communicates again with the negative pressure chamber 51. As a result, air flows into the negative pressure chamber 51 from the variable pressure chamber 52, and the pressure in the negative pressure chamber 51 increases, that is, the negative pressure Pvb in the negative pressure chamber 51 decreases. However, when the engine is in operation, the air in the negative pressure chamber 51 is discharged to the intake pipe by the operation of the engine, so that the negative pressure Pvb in the negative pressure chamber 51 increases (recovers).

On the other hand, in a case where the brake operation by the driver is finished while the operation of the engine is stopped, the negative pressure Pvb in the negative pressure chamber 51 cannot be recovered and the negative pressure Pvb remains low. In addition, especially in the diesel engine and the like in which a throttle valve is not provided in the intake pipe and it is difficult to generate high negative pressure, if the brake operation is repeatedly started and finished in a shorter period than in normal brake operation, the negative pressure Pvb in the negative pressure chamber 51 is less likely to increase (recover) even during the engine operation. Then, in a case where the brake operation is started in a state in which the negative pressure Pvb in the negative pressure chamber 51 is low in this manner, the differential pressure (that is, the maximum value of the differential pressure) between the negative pressure chamber 51 and the variable pressure chamber 52 is not so large, so that the brake operation force inputted to the brake pedal 21 is less likely to be assisted by the vacuum booster 23. That is, the assisting force by the vacuum booster 23 is less likely to increase. Especially, when the pressure in the negative pressure chamber 51 is substantially equal to the atmospheric pressure, the differential pressure between the negative pressure chamber 51 and the variable pressure chamber 52 is substantially "0 (zero)", so that the vacuum booster 23 cannot assist the brake operation force.

Figure 3:
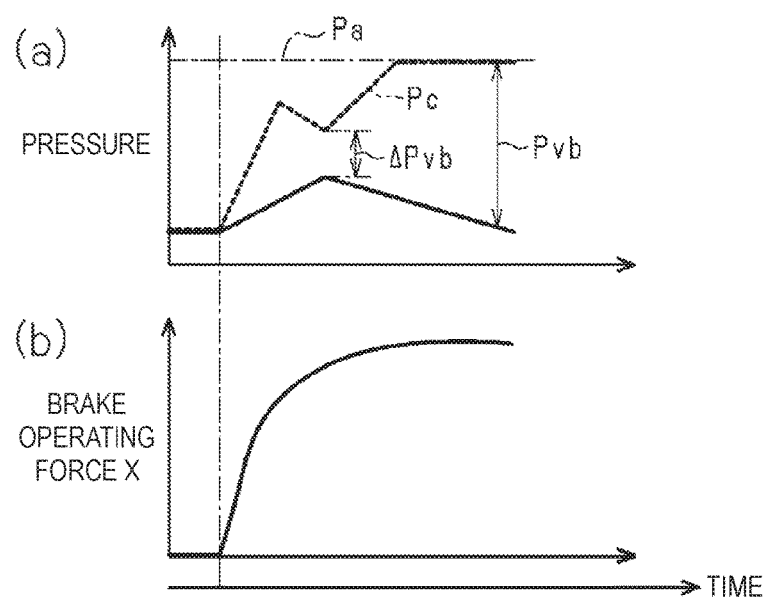
FIGS. 3(a) and 3(b) are timing charts when brake operation force is inputted to a brake pedal.

Also, as illustrated in FIGS. 3(*a*) and 3(*b*), since the atmospheric air flows from the outside into the variable pressure chamber 52 at the time of brake operation, the pressure Pc in the variable pressure chamber 52 basically increases. However, in a case where the driver performs sudden brake operation, that is, in a case where an increasing speed of a brake operation force X inputted to the vacuum booster 23 is very high, inflow of the atmospheric air to the variable pressure chamber 52 is not sufficient and pressure Pc in the variable pressure chamber 52 might decrease before this becomes equal to the atmospheric pressure Pa as indicated by a broken line in FIG. 3(*a*). Also, in a case where the driver performs the sudden brake operation, as indicated by a solid line in FIG. 3(*a*), the pressure in the negative pressure chamber 51 increases, that is, the negative pressure Pvb decreases. Therefore, differential pressure ΔPvb between the negative pressure chamber 51 and the variable pressure chamber 52 tends to temporarily decrease due to the decrease in pressure in the variable pressure chamber 52 and the increase in pressure in the negative pressure chamber 51, and it becomes difficult that the vacuum booster 23 assists the brake operation force. Meanwhile, in this specification, a state in which an increase in assisting force by the vacuum booster 23 cannot follow the increase in brake operation force in this manner is referred to as "assistance limit".

The control device 100 being the brake control device of this embodiment performs the brake assistance processing for increasing the brake force applied to the vehicle even when the vacuum booster 23 reaches the assistance limit. When this brake assistance processing is performed, the brake actuator 30 of the brake device 10 is operated. For example, in the brake actuator 30, an opening degree of the differential pressure adjusting valves 321 and 322 decreases as a target increase amount Pmadj to be described later is larger in a state in which an operating amount of the supply pumps 381 and 382 is kept constant. By such operation of the brake actuator 30, the WC pressure in each of the wheel cylinders 11*a* to 11*d* may be made higher than the MC pressure Pmc in the master cylinder, and eventually, it becomes possible to appropriately apply the brake force to the vehicle.

That is, each of the differential pressure adjusting valves 321 and 322 is provided with, for example, a valve seat and a valve body seated on the valve seat. As an interval between the valve body and the valve seat decreases, it becomes difficult that the brake fluid flows from the side of the wheel cylinders 11*a* to 11*d* to the side of the master cylinder 22. That is, this interval corresponds to the opening degree of the differential pressure adjusting valves 321 and 322. In this case, the larger an output value inputted from the control device 100 to the differential pressure adjusting valves 321 and 322 is, the larger the pressing force which is also force to bring the valve body closer toward the valve seat is. This pressing force acts in a direction against the flow of the brake fluid from the wheel cylinders 11*a* to 11*d* toward the master cylinder 22. Therefore, when the brake fluid is discharged from the supply pumps 381 and 382, the pressing force increases by increasing the output value, and eventually the opening degree of the differential pressure adjusting valves 321 and 322 decreases. As a result, the differential pressure between the master cylinder 22 side and the wheel cylinders 11*a* to 11*d* side across the differential pressure adjusting valves 321 and 322 increases.

As illustrated in FIGS. 3(*a*) and 3(*b*), in a case where the increasing speed of the brake operation force by the driver is high, it is possible to determine that the driver is requesting emergency braking. If the increasing speed of the brake operation force is high in this manner, the pressure Pc in the variable pressure chamber 52 might decrease. However, the brake device 10 is not provided with a sensor which detects the pressure Pc in the variable pressure chamber 52, and the control device 100 cannot detect a change in pressure Pc in the variable pressure chamber 52. That is, it is not possible to accurately detect the assistance limit of the vacuum booster 23 caused by the decrease in pressure Pc in the variable pressure chamber 52.

Therefore, in the control device 100 being the brake control device of this embodiment, when it is determined that the driver operating the brake pedal 21 requests the emergency braking, it is regarded that the vacuum booster 23 reaches the assistance limit due to the decrease in pressure Pc in the variable pressure chamber 52 thereafter, and the brake assistance processing is started. Meanwhile, when the driver starts operating the brake pedal 21 so as to request the emergency braking, it is possible to determine that the emergency braking is requested before the vacuum booster 23 reaches a predicted assistance limit in general.

Figure 4:
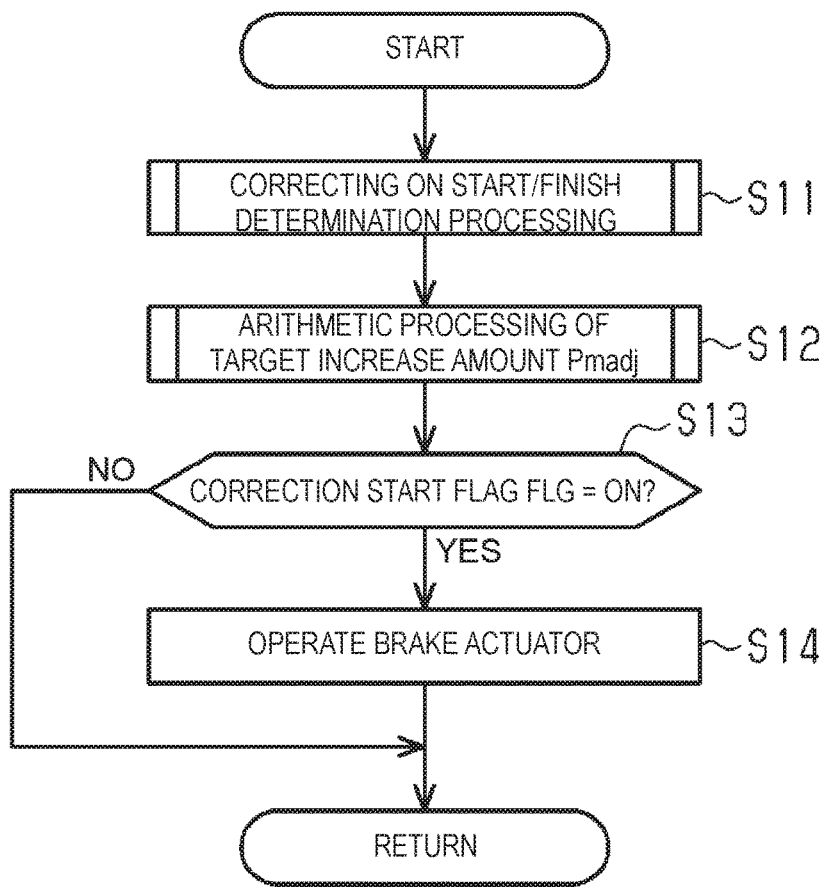
FIG. 4 is a flowchart illustrating a processing routine executed by the control device, the processing routine executed when the brake pedal is operated by a driver.

Next, with reference to a flowchart illustrated in FIG. 4, a processing routine executed by the control device 100 so as to perform the brake assistance processing is described. This processing routine is a routine executed in every control cycle set in advance while the brake pedal 21 is operated by the driver and the brake switch SW1 is turned on.

As illustrated in FIG. 4, in this processing routine, the control device 100 executes correction start/finish determination processing for determining start timing and finish timing of the brake assistance processing (step S11). The correction start/finish determination processing is to be described later with reference to a flowchart illustrated in FIG. 5. Subsequently, the control device 100 performs arithmetic processing of the target increase amount Pmadj (step S12). This arithmetic processing is to be described later with reference to a flowchart illustrated in FIG. 6. Then, the control device 100 determines whether a correction start flag FLG to be described later is turned on (step S13). When the correction start flag FLG is turned on, it may be determined that an execution condition of the brake assistance processing is satisfied, and when the correction start flag FLG is turned off, it may be determined that the execution condition of the brake assistance processing is not satisfied.

Therefore, in a case where the correction start flag FLG is turned OFF (step S13: NO), the control device 100 temporarily finishes this processing routine. On the other hand, in a case where the correction start flag FLG is turned on (step S13: YES), the control device 100 operates the brake actuator 30 according to the calculated target increase amount Pmadj (step S14). That is, in a state in which the supply pumps 381 and 382 are operated, the control device 100 sets the output value to the differential pressure adjusting valves 321 and 322 to a value corresponding to the target increase amount Pmadj. Then, the control device 100 temporarily finishes this processing routine. Therefore, in this specification, the control device 100 forms an example of an "assistance control unit" which performs the brake assistance processing to assist the increase in WC pressure in the wheel cylinders 11a to 11d by operating the brake actuator 30 when determining that the emergency braking is requested from an operation mode of the brake pedal 21.

Figure 5:
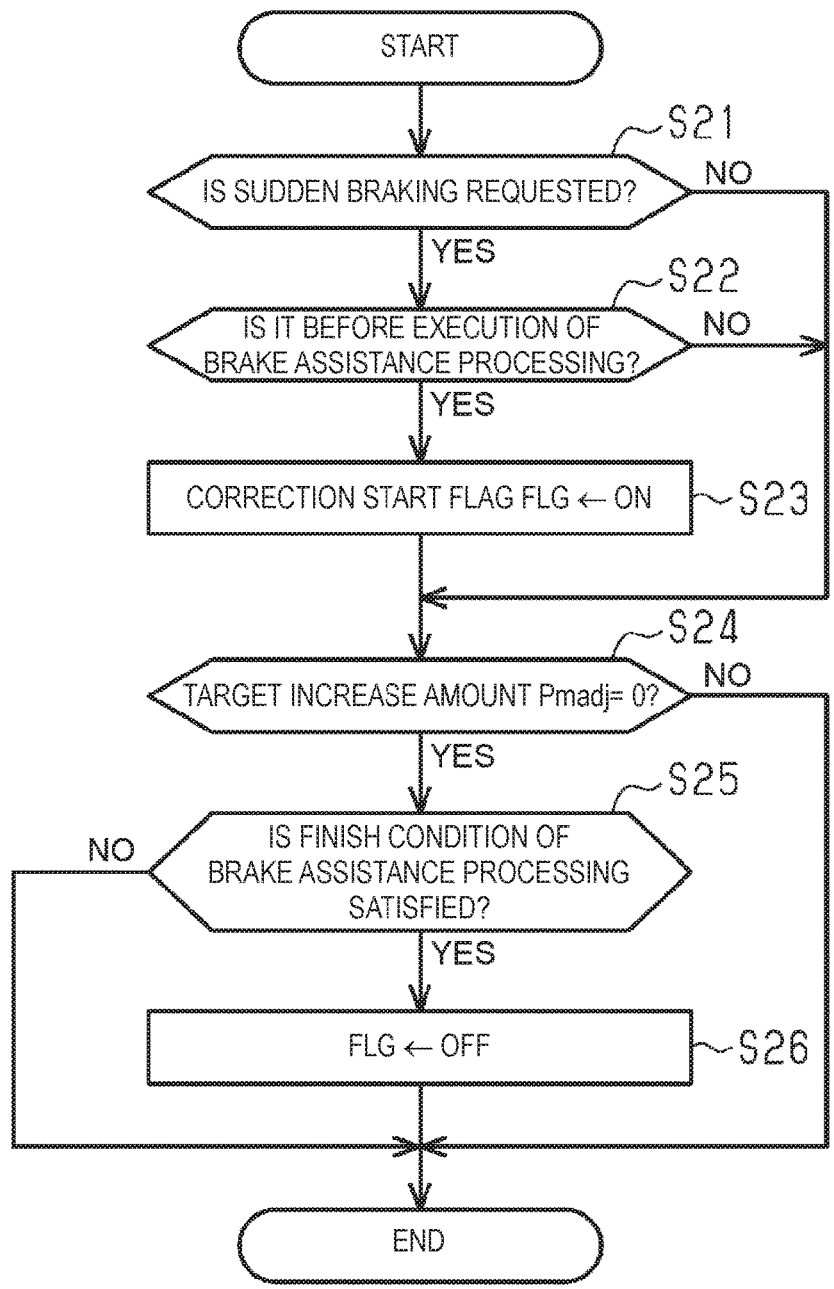
FIG. 5 is a flowchart illustrating a processing routine executed by the control device, the processing routine executed for determining start timing and finish timing of brake assistance processing.

Next, with reference to a flowchart illustrated in FIG. 5, the correction start/finish determination processing at step S11 described above is described.

As illustrated in FIG. 5, in this processing routine, the control device 100 determines whether the driver requests the emergency braking (step S21). That is, the control device 100 determines whether the emergency braking is requested according to a parameter that changes according to the increase in brake operation force X. Such parameter may include, for example, the increasing speed of the MC pressure Pmc in the master cylinder, the decreasing speed of the negative pressure Pvb in the negative pressure chamber 51 and the like. In a case where the increasing speed of the MC pressure Pmc is adopted, the control device 100 may determine that the emergency braking is requested when duration time in which the increasing speed of the MC pressure Pmc is equal to or higher than a determination speed is equal to or longer than determination time. Meanwhile, the lower the negative pressure Pvb in the negative pressure chamber 51 is, the lower the determination speed is made. By making the determination speed variable in this manner, it is possible to determine that the emergency braking is requested before the vacuum booster 23 actually reaches the assistance limit.

In a case where it is not determined that the driver requests the emergency braking (step S21: NO), the control device 100 shifts the procedure to step S24 to be described later. On the other hand, in a case where it is determined that the driver requests the emergency braking (step S21: YES), the control device 100 determines whether it is before the execution of the brake assistance processing (step S22). That is, even in a case where the control device 100 determines that the emergency braking is requested, this may determine that it is before the execution of the brake assistance processing when the brake actuator 30 is not yet operated, and determine that the brake assistance processing is already performed when the brake actuator 30 is already operated.

In a case where it is not before the execution of the brake assistance processing (step S22: NO), the control device 100 shifts the procedure to step S24 to be described later. On the other hand, in a case where it is before the execution of the brake assistance processing (step S22: YES), the control device 100 turns on the correction start flag FLG (step S23) and shifts the procedure to next step S24.

At step S24, the control device 100 determines whether the target increase amount Pmadj is "0 (zero)". In a case where the target increase amount Pmadj is not "0 (zero)" (step S24: NO), the control device 100 finishes this processing routine. On the other hand, in a case where the target increase amount Pmadj is "0 (zero)" (step S24: YES), the control device 100 determines whether a finish condition of the brake assistance processing is satisfied (step S25). The finish condition may be, for example, that the vehicle stops, and that the negative pressure Pvb in the negative pressure chamber 51 is equal to or higher than the MC pressure Pmc in the master cylinder 22. In a case where the finish condition is satisfied (step S25: YES), the control device 100 turns off the correction start flag FLG (step S26) and finishes this processing routine. On the other hand, in a case where the finish condition is not satisfied (step S25: NO), the control device 100 finishes this processing routine without turning off the correction start flag FLG.

Figure 6:
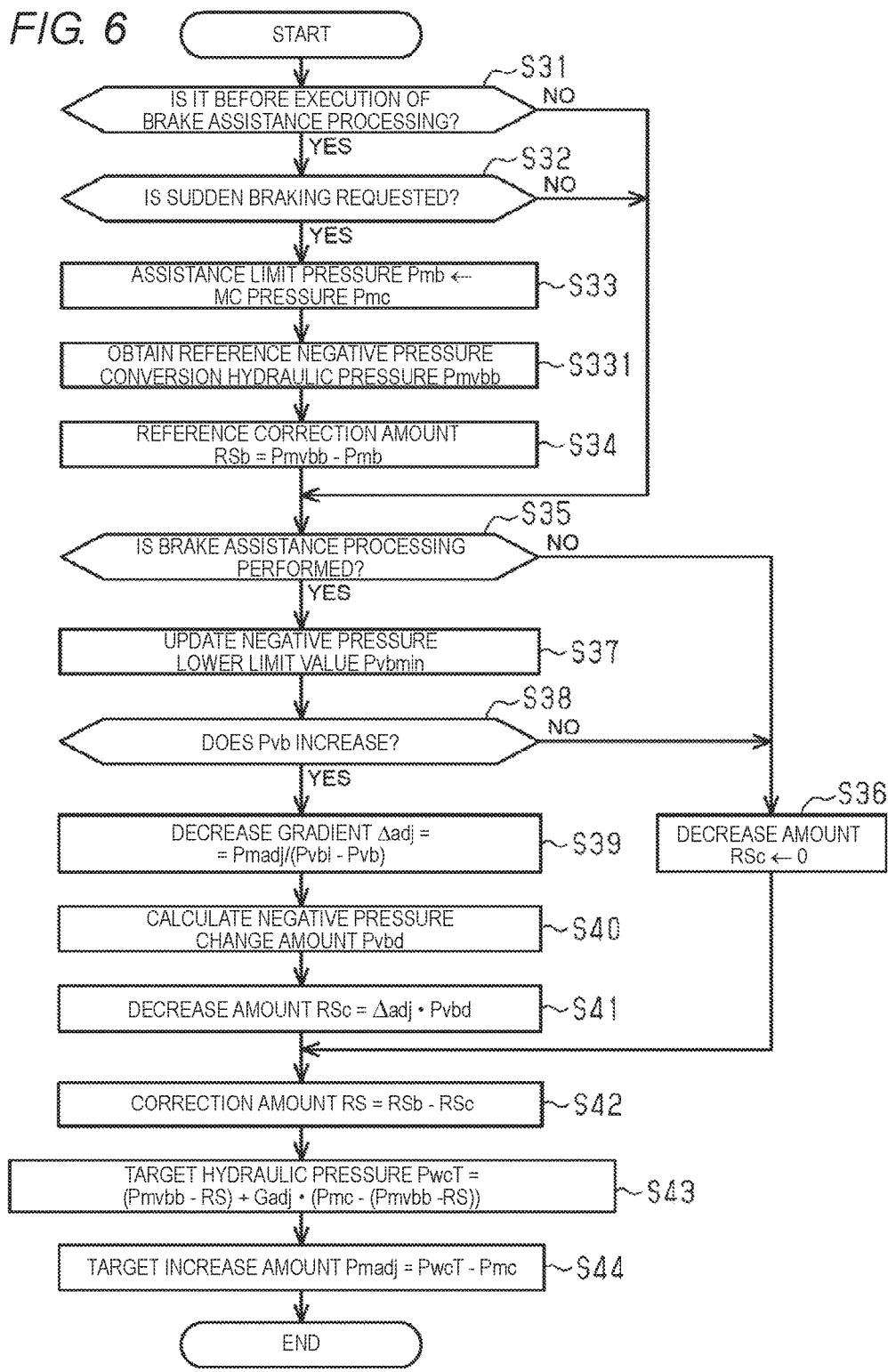
FIG. 6 is a flowchart illustrating a processing routine executed by the control device, the processing routine executed for setting a target increase amount.

Next, with reference to a flowchart illustrated in FIG. 6, arithmetic processing of the target increase amount Pmadj at step S12 described above is described.

As illustrated in FIG. 6, in this processing routine, the control device 100 determines whether it is before the execution of the brake assistance processing (step S31). In a case where the brake actuator 30 is operated and it is not before the execution of the brake assistance processing (step S31: NO), the control device 100 shifts the procedure to step S35 to be described later. On the other hand, in a case where the brake actuator 30 is not operated and it is before the execution of the brake assistance processing (step S31: YES), the control device 100 determines whether the driver requests the emergency braking (step S32). In a case where it is not determined that the driver requests the emergency braking (step S32: NO), the control device 100 shifts the procedure to step S35 to be described later.

On the other hand, in a case where it is determined that the driver requests the emergency braking (step S32: YES), the control device 100 obtains current MC pressure Pmc in the master cylinder 22 detected by the pressure sensor SE5 and makes the MC pressure Pmc assistance limit pressure Pmb (step S33). Subsequently, the control device 100 derives negative pressure conversion hydraulic pressure Pmvb being MC pressure at a point in time when the vacuum booster 23 reaches the assistance limit predicted from the current negative pressure Pvb in the negative pressure chamber 51 detected by the negative pressure sensor SE7 and makes the current negative pressure conversion hydraulic pressure Pmvb reference negative pressure conversion hydraulic pressure Pmvbb (step S31). The negative pressure conversion hydraulic pressure Pmvb may be derived by using a predetermined map illustrating a relationship between the negative pressure Pvb and the MC pressure Pmc. The negative pressure conversion hydraulic pressure Pmvb increases as the negative pressure Pvb increases. Meanwhile, at a point in time when it is determined that the emergency braking is requested, the negative pressure conversion hydraulic pressure Pmvb is larger than the MC pressure Pmc (that is, the assistance limit pressure Pmb) at the same point in time.

Subsequently, the control device 100 subtracts the assistance limit pressure Pmb from the reference negative pressure conversion hydraulic pressure Pmvbb, and makes a difference (=Pmvbb−Pmb) a reference correction amount RSb (step S34). Then, the control device 100 shifts the procedure to next step S35.

At step S35, the control device 100 determines whether the brake assistance processing is already executed. At that time, when the supply pumps 381 and 382 of the brake actuator 30 are operated, the control device 100 may determine that the brake assistance processing is performed, and when the supply pumps 381 and 382 are not operated yet even when the execution condition is satisfied, this may determine that the brake assistance processing is not yet performed. In a case where the brake assistance processing is not yet performed (step S35: NO), the control device 100 assigns "0 (zero)" to a decrease amount RSc to be described later (step S36), and shifts the procedure to step S42 to be described later.

On the other hand, in a case where the brake assistance processing is already performed (step S35: YES), the control device 100 updates a negative pressure lower limit value Pvbmin (step S37). The negative pressure lower limit value Pvbmin is set to the maximum value of the negative pressure that may be generated in the negative pressure chamber 51 when the brake assistance processing is not performed. Therefore, when the brake assistance processing is started, the negative pressure Pvb at a point in time when the processing is started is assigned to the negative pressure lower limit value Pvbmin. Then, after that, the negative pressure lower limit value Pvbmin is compared with the current negative pressure Pvb, and a smaller value is set as the negative pressure lower limit value Pvbmin.

Subsequently, the control device 100 determines whether the negative pressure Pvb in the negative pressure chamber 51 is increasing (step S38). For example, the control device 100 may calculate a changing speed of the negative pressure Pvb, and when the changing speed is higher than "0 (zero)", this may determine that the negative pressure Pvb increases. In this case, the changing speed of the negative pressure Pvb may be a value obtained by temporal differentiation of the negative pressure Pvb or a difference obtained by subtracting the negative pressure Pvb obtained in a previous control cycle from the negative pressure Pvb obtained in a current control cycle. The control device 100 may also determine that the negative pressure Pvb increases when the current negative pressure Pvb is larger than the negative pressure lower limit value Pvbmin.

In a case where the negative pressure Pvb does not increase (step S38: NO), the control device 100 shifts the procedure to step S36 described above. On the other hand, in a case where the negative pressure Pvb increases (step S38: YES), the control device 100 calculates a decrease gradient Δadj (step S39). That is, the control device 100 obtains the negative pressure Pvbi in the intake pipe from the control device that controls the engine and obtains a difference (=Pvbi−Pvb) obtained by subtracting the negative pressure Pvb in the negative pressure chamber 51 from the negative pressure Pvbi in the intake pipe. Then, the control device 100 divides the target increase amount Pmadj set in the previous control cycle by the difference and makes a quotient (=Pmadj/(Pvbi−Pvb)) the decrease gradient Δadj. The decrease gradient Δadj tends to be larger as the negative pressure Pvb in the negative pressure chamber 51 increases.

Subsequently, the control device 100 calculates a negative pressure change amount Pvbd (step S40). That is, the control device 100 subtracts the negative pressure lower limit value Pvbmin from the current negative pressure Pvb in the negative pressure chamber 51 and makes a difference (=Pvb−Pvbmin) the negative pressure change amount Pvbd. Then, the control device 100 multiplies the calculated decrease gradient Δadj by the negative pressure change amount Pvbd, and makes a product (=Δadj·Pvbd) the decrease amount RSc (step S41). That is, in a case where the negative pressure Pvb in the negative pressure chamber 51 increases, the decrease amount RSc is a positive value, whereas in a case where the negative pressure Pvb is maintained, the negative pressure change amount Pvbd is "0 (zero)", so that the decrease amount RSc is "0 (zero)". Subsequently, the control device 100 shifts the procedure to next step S42.

At step S42, the control device 100 subtracts the decrease amount RSc from the reference correction amount RSb, and makes the difference (=RSb−RSc) a correction amount RS. The decrease amount RSc is set to "0 (zero)" when the negative pressure Pvb in the negative pressure chamber 51 does not increase, whereas this is set to a value larger than "0 (zero)" when the negative pressure Pvb increases. Therefore, the correction amount RS is maintained at the reference correction amount RSb when the negative pressure Pvb in the negative pressure chamber 51 does not increase, whereas this is smaller than the reference correction amount RSb when the negative pressure Pvb increases.

Subsequently, the control device 100 calculates a target hydraulic pressure PwcT using the following relational expression (equation 2) (step S43). Meanwhile, in the vehicle brake control device of this embodiment, a correction gain Gadj is a gain obtained when ideal brake operation in terms of a design of the vacuum booster 23 is performed.

[Expression 2]

$$PwcT=(Pmvbb-RS)+Gadj\cdot(Pmc-(Pmvbb-RS)) \quad \text{(Equation 2)}$$

That is, in a case where the decrease amount RSc is "0 (zero)", the correction amount RS is equal to the reference correction amount RSb, and "Pmvbb−RS" in the relational expression (equation 2) is equal to the assistance limit pressure Pmb. Therefore, when the brake pedal 21 is operated by the driver and the negative pressure Pvb in the negative pressure chamber 51 decreases, as the MC pressure Pmc in the master cylinder 22 at the point in time when it is determined that the emergency braking is requested is lower, "Pmvbb−RS" being the assistance limit pressure Pmb becomes smaller, so that the target hydraulic pressure PwcT increases. On the other hand, in a case where the negative pressure Pvb increases and the decrease amount RSc is larger than "0 (zero)", the correction amount RS becomes smaller than the reference correction amount RSb, so that "Pmvbb−RS" becomes larger than the assistance limit pressure Pmb, and as a result, the target hydraulic pressure PwcT becomes smaller. That is, when the negative pressure Pvb increases, the target hydraulic pressure PwcT is corrected to decrease. Therefore, in this specification, the control device 100 forms an example of a "target hydraulic pressure setting unit".

Subsequently, the control device 100 subtracts the current MC pressure Pmc in the master cylinder 22 from the calculated target hydraulic pressure PwcT and makes the difference (=PwcT− Pmc) the target increase amount Pmadj (step S44). In this regard, in this specification, the control device 100 forms an example of a "target increase amount setting unit" which, when determining that the emergency braking is requested, makes the MC pressure Pmc at that point in time the assistance limit pressure Pmb and sets the target increase amount Pmadj based on the assistance limit pressure Pmb. When the target increase amount Pmadj is set in this manner, the control device 100 finishes this processing routine.

Figure 7:
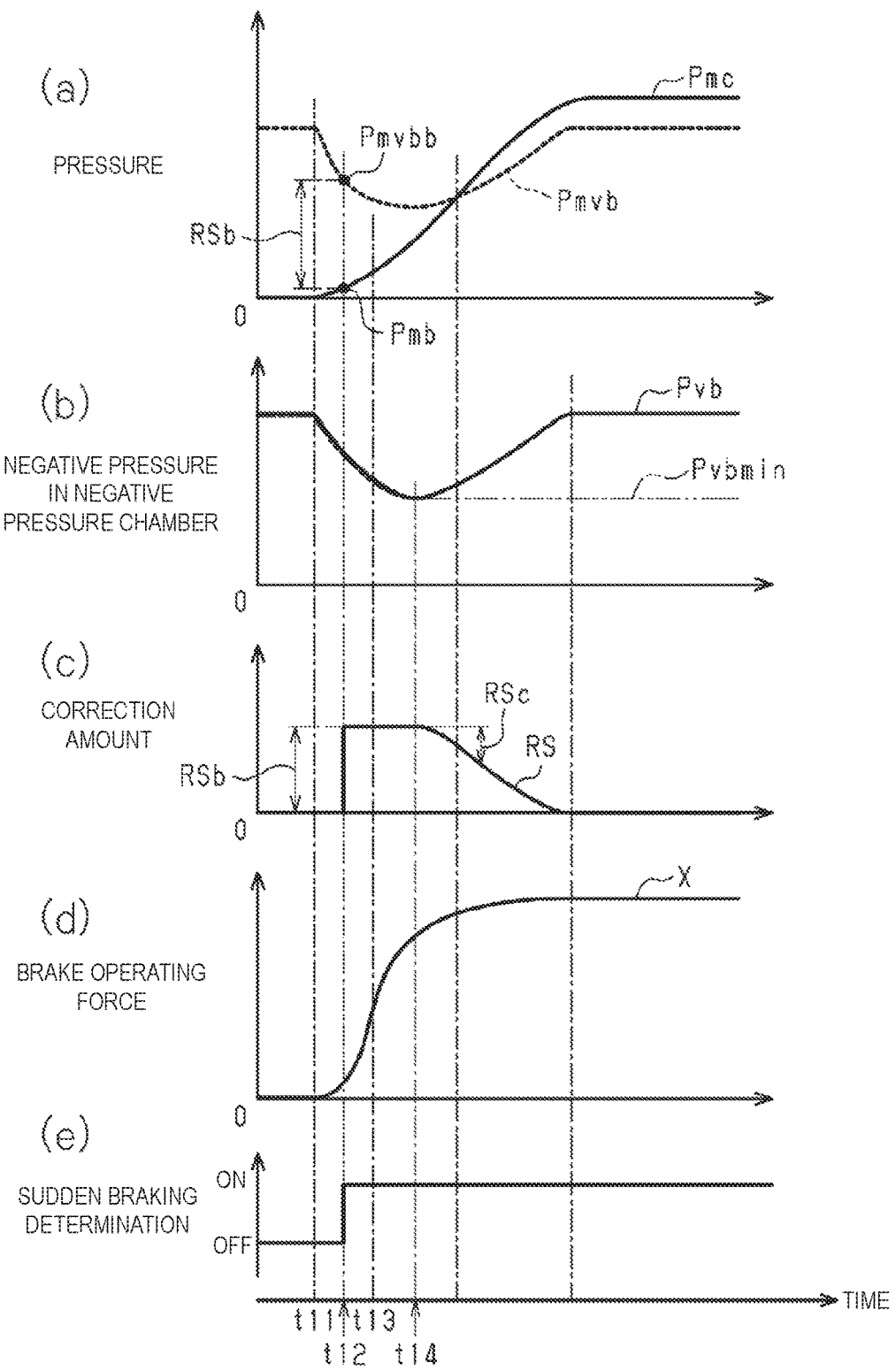
FIGS. 7(a) to 7(e) are timing charts when the brake assistance processing is performed in the brake device.

Next, with reference to a timing chart illustrated in FIGS. 7(*a*) to 7(*e*), an action when the brake assistance processing is performed when the vehicle runs is described. In FIG. 7(*a*), a broken line indicates a transition of the above-described negative pressure conversion hydraulic pressure Pmvb. Meanwhile, in a case where the emergency braking is requested, as illustrated in FIG. 7(*a*), the vacuum booster 23 cannot exert original assisting force corresponding to the brake operation by the driver even in a case where the MC pressure Pmc in the master cylinder 22 is equal to or lower than the negative pressure conversion hydraulic pressure Pmvb for a reason that the inflow of the atmospheric air into the variable pressure chamber 52 cannot follow the brake operation by the driver. Therefore, it is effective to start the brake assistance processing before the MC pressure Pmc in the master cylinder 22 reaches the negative pressure conversion hydraulic pressure Pmvb.

As illustrated in FIGS. 7(*a*) to 7(*e*), the brake operation is started by the driver at first timing t11 while the vehicle runs. Since the increasing speed of the brake operation force X at that time is high, it is determined that the emergency braking is requested by the driver at second timing t12 thereafter (steps S21 and S22: YES). Therefore, it is determined that the execution condition of the brake assistance processing is satisfied (step S23). At that point in time, the supply pumps 381 and 382 of the brake actuator 30 are not yet operated. Then, the MC pressure Pmc in the master cylinder 22 at second timing t12 immediately before the start of the execution of the brake assistance processing is made the assistance limit pressure Pmb (step S33), and the difference obtained by subtracting the assistance limit pressure Pmb from the reference negative pressure conversion hydraulic pressure Pmvbb which is the negative pressure conversion hydraulic pressure Pmvb at second timing t12 is made the reference correction amount RSb (step S34). Immediately after it is determined that the emergency braking is requested, the brake assistance processing is not yet performed (step S35: NO), so that the decrease amount RSc is set to "0 (zero)" (step S36). As a result, the correction amount RS is made equal to the reference correction amount RSb (step S42), the target hydraulic pressure PwcT and the target increase amount Pmadj are calculated by using this correction amount RS (steps S43 and S44), and the brake actuator 30 is operated according to the target increase amount Pmadj (step S14). That is, the brake assistance processing is started.

While the negative pressure Pvb in the negative pressure chamber 51 continuously decreases during the execution of the brake assistance processing in this manner (step S38: NO), the negative pressure lower limit value Pvbmin is decreased (step S37) and the decrease amount RSc is maintained at "0 (zero)" (step S36). That is, the output value to the differential pressure adjusting valves 321 and 322 of the brake actuator 30 is maintained at a value corresponding to the reference target increase amount PmadjM (step S14). That is, the opening degree of the differential pressure adjusting valves 321 and 322 is maintained.

Meanwhile, the decrease in negative pressure Pvb in the negative pressure chamber 51 is continued even during the execution of the brake assistance processing in this manner. In this example, at third timing t13 during the decrease in negative pressure Pvb in this manner, the operating speed of the brake pedal 21 by the driver is maximized.

After third timing t13, the increasing speed of the brake operation force X starts decreasing. As a result, the decreasing speed of the negative pressure Pvb in the negative pressure chamber 51 gradually decreases, and the negative pressure Pvb starts increasing at fourth timing t14 (step S38: YES). From fourth timing t14, the decrease gradient Δadj and the negative pressure change amount Pvbd are calculated (steps S39 and S40). Then, the product of the decrease gradient Δadj and the negative pressure change amount Pvbd becomes the decrease amount RSc (step S41). The decrease gradient Δadj increases as the negative pressure Pvb in the negative pressure chamber 51 increases. Therefore, in a case where the negative pressure Pvb increases as seen after fourth timing t14, the decrease amount RSc is likely to increase.

As the decrease amount RSc increases in this manner, the target hydraulic pressure PwcT decreases (step S43). Therefore, the target increase amount Pmadj also decreases (step S44), so that the output value to the differential pressure adjusting valves 321 and 322 of the brake actuator 30 gradually decreases (step S14). As a result, the opening degree of the differential pressure adjusting valves 321 and 322 gradually increases and the differential pressure between the inside of the master cylinder 22 and the inside of the wheel cylinders 11*a* to 11*d* gradually decreases.

According to the above-described configuration and action, the following effects may be obtained.

(1) The brake assistance processing is started on condition that it is determined that the emergency braking is requested in a situation in which the driver performs the brake operation. Therefore, even in a case where the sensor which detects the pressure in the variable pressure chamber 52 of the vacuum booster 23 is not provided, the brake assistance processing may be started before the vacuum booster 23 reaches the assistance limit predicted from the negative pressure and the like.

(2) A discharge amount of the brake fluid from the supply pumps 381 and 382 at the time of activation of the brake actuator 30 is likely to be smaller than the discharge amount of the brake fluid from the supply pumps 381 and 382 in a stationary state. That is, when the supply pumps 381 and 382 are activated, the increase in WC pressure in the wheel cylinders 11*a* to 11*d* is likely to delay. In this regard, in the vehicle brake control device of this embodiment, the brake assistance processing is started before the vacuum booster 23 reaches the predicted assistance limit. Therefore, the discharge amount of the brake fluid from the supply pumps 381 and 382 may be brought closer to the discharge amount in the stationary state earlier. Therefore, even in a case where a response delay occurs in the supply pumps 381 and 382, it is possible to appropriately assist the increase in WC pressure.

(3) In the vehicle brake control device according to this embodiment, the reference correction amount RSb increases as the MC pressure Pmc at the point in time when it is determined that the emergency braking is requested is low and as assistance efficiency by the vacuum booster 23 is predicted to be low. As a result, since the target increase amount Pmadj increases, the assistance of the brake operation by the driver may be appropriately performed according to the assistance efficiency by the vacuum booster 23.

(4) During the execution of the brake assistance processing, when the negative pressure Pvb in the negative pressure chamber 51 starts recovering, the assistance efficiency by the vacuum booster 23 gradually increases, so that the target hydraulic pressure PwcT is corrected to decrease. As a result, as compared with a case where the target hydraulic pressure PwcT is not corrected to decrease even when the assistance efficiency is high, the target increase amount Pmadj easily becomes small, so that the correction of the brake force by the execution of the brake assistance processing is less likely to be excessive. Therefore, a gap between vehicle deceleration assumed by the driver and actual vehicle deceleration is suppressed, and drivability may be improved.

(5) Furthermore, the decreasing speed when the target increase amount Pmadj is corrected to decrease may be made the speed corresponding to a recovery speed of the negative pressure Pvb in the negative pressure chamber 51. In such a point as well, it is possible to suppress excessive correction of the brake force by the execution of the brake assistance processing, thereby contributing to improvement in drivability.

Second Embodiment

Next, a second embodiment embodying a vehicle brake control device is described with reference to FIG. 8. In the vehicle brake control device of this embodiment, a method of calculating a target increase amount Pmadj and the like is different from that of the first embodiment. Therefore, in the following description, parts different from those of the first embodiment are mainly described, and the same reference sign is assigned to the same or corresponding member configuration as that of the first embodiment to omit the description thereof.

Figure 8:
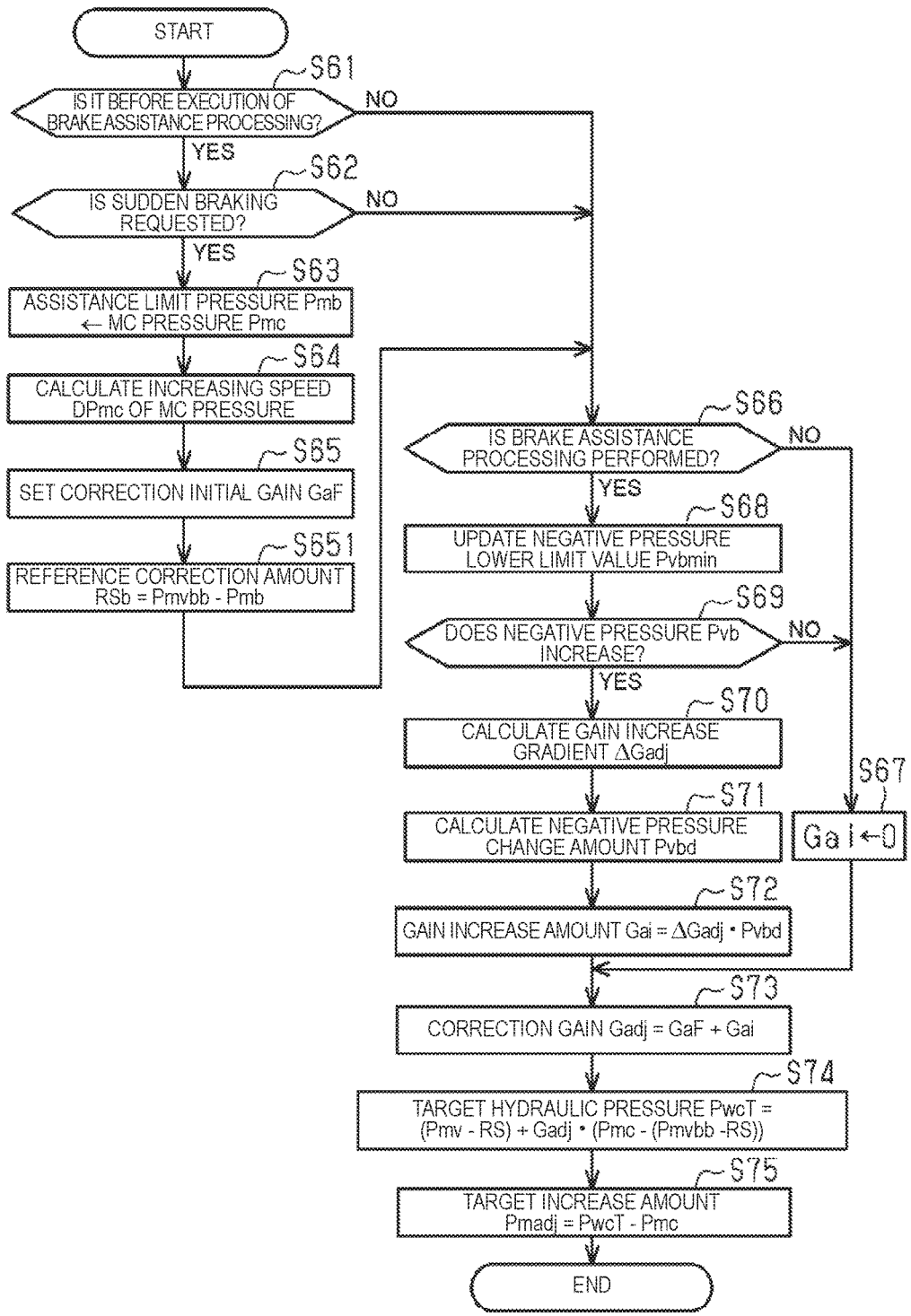
FIG. 8 is a flowchart illustrating a processing routine executed by a control device which is a second embodiment of a vehicle brake control device, the processing routine executed for setting a target increase amount.

With reference to a flowchart illustrated in FIG. 8, arithmetic processing of the target increase amount Pmadj at step S11 described above is described.

As illustrated in FIG. 8, in this processing routine, a control device 100 determines whether it is before execution of brake assistance processing (step S61). In a case where a brake actuator 30 is operated and it is not before the execution of the brake assistance processing (step S61: NO), the control device 100 shifts the procedure to step S66 to be described later. On the other hand, in a case where the brake actuator 30 is not operated and it is before the execution of the brake assistance processing (step S61: YES), the control device 100 determines whether a driver requests emergency braking (step S62). In a case where it is not determined that the driver requests the emergency braking (step S62: NO), the control device 100 shifts the procedure to step S66 to be described later.

On the other hand, in a case where it is determined that the driver requests the emergency braking (step S62: YES), the control device 100 obtains current MC pressure Pmc in a master cylinder 22 detected by a pressure sensor SE5 and makes the MC pressure Pmc assistance limit pressure Pmb (step S63). Subsequently, the control device 100 performs temporal differentiation on the current MC pressure Pmc in the master cylinder 22 detected by the pressure sensor SE5 and obtains an increasing speed DPmc of the MC pressure (step S64).

Then, the control device 100 sets a correction initial gain GaF on the basis of reference negative pressure conversion hydraulic pressure Pmvbb being negative pressure conversion hydraulic pressure Pmvb correlated with negative pressure Pvb in a negative pressure chamber 51 at a point in time when it is determined that the emergency braking is requested and the increasing speed DPmc of the MC pressure at the same point in time (step S65). That is, the control device 100 decreases the correction initial gain GaF as the increasing speed DPmc of the MC pressure at that point in time is smaller and decreases the same as the reference negative pressure conversion hydraulic pressure Pmvbb is higher. The increasing speed DPmc of the MC pressure corresponds to an operating speed of a brake pedal 21 by the driver. Therefore, the correction initial gain GaF set in this manner decreases as the operating speed of the brake pedal 21 is lower. Therefore, in this specification, the control device 100 forms an example of an "initial gain setting unit" which sets the correction initial gain GaF on the basis of the operating speed of the brake pedal 21 and the assistance limit pressure Pmb when the brake assistance processing is not executed. When the correction initial gain GaF is set in this manner, the control device 100 shifts the procedure to next step S651.

Herein, the correction initial gain GaF obtained in this manner is smaller than a predetermined correction gain (hereinafter also referred to as a "predetermined correction gain GaB") used in the above-described first embodiment.

At step S651, the control device 100 subtracts the assistance limit pressure Pmb from the reference negative pressure conversion hydraulic pressure Pmvbb, and makes a difference (=Pmvbb−Pmb) a reference correction amount RSb.

Then, the control device 100 determines whether the brake assistance processing is already executed (step S66). In a case where the brake actuator 30 is not yet operated and the brake assistance processing is not yet executed (step S66: NO), the control device 100 assigns "0 (zero)" to a gain increase amount Gai to be described later (step S67) and shifts the procedure to step S73 to be described later. On the other hand, in a case where the brake actuator 30 is already operated and the brake assistance processing is already executed (step S66: YES), the control device 100 updates a negative pressure lower limit value Pvbmin (step S68). The negative pressure lower limit value Pvbmin is set to the maximum value of the negative pressure that may be generated in the negative pressure chamber 51 when the brake assistance processing is not performed. Therefore, when the brake assistance processing is started, the negative pressure Pvb at a point in time when the processing is started is assigned to the negative pressure lower limit value Pvbmin. Then, after that, the negative pressure lower limit value Pvbmin is compared with the current negative pressure Pvb, and a smaller value is set as the negative pressure lower limit value Pvbmin.

Subsequently, the control device 100 determines whether the negative pressure Pvb in the negative pressure chamber 51 increases (step S69). In a case where the negative pressure Pvb does not increase (step S69: NO), the control device 100 shifts the procedure to step S67 described above. On the other hand, in a case where the negative pressure Pvb increases (step S69: YES), the control device 100 calculates a gain increase gradient ΔGadj (step S70). That is, the control device 100 obtains a negative pressure Pvbi in an intake pipe from a control device which controls an engine and obtains a negative pressure difference (=Pvbi−Pvb) being the difference obtained by subtracting the negative pressure Pvb in the negative pressure chamber 51 from the negative pressure Pvbi in the intake pipe. Also, the control device 100 subtracts the correction initial gain GaF from the above-described predetermined correction gain GaB and obtains a gain difference which is the difference therebetween (=GaB−GaF). Then, the control device 100 divides the gain difference by the negative pressure difference and makes a quotient (=(GaB−GaF)/(Pvbi−Pvb)) the gain increase gradient ΔGadj.

Subsequently, the control device 100 calculates the above-described negative pressure change amount Pvbd (step S71). Then, the control device 100 multiplies the calculated gain increase gradient ΔGadj by the negative pressure change amount Pvbd and makes a product (=ΔGadj·Pvbd) the gain increase amount Gai (step S72). Subsequently, the control device 100 shifts the procedure to next step S73.

At step S73, the control device 100 adds the correction initial gain GaF to the gain increase amount Gai and makes the sum (=GaF+Gai) the correction gain Gadj. The gain increase amount Gai is set to "0 (zero)" when the negative pressure Pvb in the negative pressure chamber 51 does not increase, whereas this is set to a value larger than "0 (zero)" when the negative pressure Pvb increases. Therefore, when the negative pressure Pvb in the negative pressure chamber 51 does not increase, the correction gain Gadj is maintained at the correction initial gain GaF, whereas when the negative pressure Pvb increases, the correction gain Gadj is larger than the correction initial gain GaF. That is, when the negative pressure Pvb increases, the correction gain Gadj is corrected to increase. As a result, the correction gain Gadj approaches the predetermined correction gain GaB as the negative pressure Pvb recovers. When the negative pressure Pvb becomes substantially equal to the negative pressure Pvbi in the intake pipe, the correction gain Gadj becomes substantially equal to the predetermined correction gain GaB.

Then, the control device 100 calculates a target hydraulic pressure PwcT using the calculated correction gain Gadj (step S74). At that time, the target hydraulic pressure PwcT is calculated by assigning the reference correction amount RSb to the correction amount RS of the relational expression (equation 2). That is, "Pmvbb−RS (=RSb)" in the relational expression (equation 2) is the assistance limit pressure Pmb. Therefore, by calculating "(Pmvbb−RS)+Gadj·(Pmc−(Pmvbb−RS))", the control device 100 multiplies the correction gain Gadj by a difference (Pmc−Pmb) obtained by subtracting the assistance limit pressure Pmb from Pmc in the master cylinder 22 and makes the sum of the product and the assistance limit pressure Pmb (=Pmb+Gadj·(Pmc−Pmb)) the target hydraulic pressure PwcT. In this regard, in this specification, the control device 100 that executes steps S73 and S74 forms an example of a "target hydraulic pressure setting unit".

Subsequently, the control device 100 subtracts the current MC pressure Pmc in the master cylinder 22 from the calculated target hydraulic pressure PwcT and makes the difference (=PwcT− Pmc) the target increase amount Pmadj (step S75).

That is, the target increase amount Pmadj may be represented by the following relational expression (equation 3). Then, this relational expression (equation 3) may be transformed to the following relational expression (equation 4).

[Expression 3]

$$Pmadj = Pmb + Gadj \cdot (Pmc - Pmb) - Pmc \quad \text{(Equation 3)}$$

$$Pmadj = (1 - Gadj) \cdot (Pmb - Pmc) \quad \text{(Equation 4)}$$

In a case where the gain increase amount Gai is "0 (zero)", the correction gain Gadj is equal to the correction initial gain GaF, so that the correction gain Gadj is a value based both on the increasing speed of the MC pressure Pmc in the master cylinder 22 at the point in time when it is determined that the emergency braking is requested and on the reference negative pressure conversion hydraulic pressure Pmvbb. Therefore, the target increase amount Pmadj calculated using the correction gain Gadj decreases as the operating speed of the brake pedal 21 at that point in time is lower, and decreases as the reference negative pressure conversion hydraulic pressure Pmvbb (that is, the negative pressure Pvb in the negative pressure chamber 51) is higher. Therefore, in this specification, the control device 100 forms an example of a "target increase amount setting unit" which sets the target increase amount Pmadj on the basis of the operating speed of the brake pedal 21 at the point in time when it is determined that the emergency braking is requested and the reference negative pressure conversion hydraulic pressure Pmvbb.

Also, when the negative pressure Pvb in the negative pressure chamber 51 starts recovering (that is, increasing), the gain increase amount Gai increases, and as a result, the correction gain Gadj becomes larger than the correction initial gain GaF. That is, the correction gain Gadj is corrected to increase. As the correction gain Gadj increases in this manner, "(1−Gadj)" in the relational expression (equation 2) becomes smaller. Therefore, by correcting to increase the correction gain Gadj, the target increase amount Pmadj is decreased.

When the target increase amount Pmadj is set in this manner, the control device 100 finishes this processing routine.

According to the above-described configuration and action, in addition to the effects equivalent to the effects (1) and (2) of the first embodiment described above, the following effects may be obtained.

(6) In the vehicle brake control device of this embodiment, the target increase amount Pmadj is calculated while taking the negative pressure Pvb in the negative pressure chamber 51 at the point in time when it is determined that the emergency braking is requested and the increasing speed of the MC pressure at the same point in time into account. Therefore, even in a case where it is determined that the emergency braking is requested, when the operating speed of the brake pedal 21 by the driver is relatively low, the target increase amount Pmadj is less likely to become excessive. Therefore, by operating the brake actuator 30 on the basis of such target increase amount Pmadj, it is possible to suppress excessive assistance of the brake operation by the driver.

(7) During the execution of the brake assistance processing, when the negative pressure Pvb in the negative pressure chamber 51 starts recovering due to a decrease in operating speed of the brake pedal 21 by the driver, assistance efficiency by a vacuum booster 23 gradually increases, so that the target increase amount Pmadj is decreased. By decreasing the target increase amount Pmadj by the recovery of the negative pressure Pvb in this manner, correction of brake force due to the execution of the brake assistance processing is less likely to become excessive. Therefore, a gap between vehicle deceleration assumed by the driver and actual vehicle deceleration is suppressed, and drivability may be improved.

(8) Furthermore, a decreasing speed when decreasing the target increase amount Pmadj may be made the speed corresponding to a recovery speed of the negative pressure Pvb in the negative pressure chamber 51. In such a point as well, it is possible to suppress excessive correction of the brake force by the execution of the brake assistance processing, thereby contributing to improvement in drivability.

Meanwhile, each of the above-described embodiments may be changed to another embodiment as described below.

There is a case in which the control device 100 applied to the brake device 10 cannot obtain the negative pressure Pvbi in the intake pipe from the control device for the engine. In this case, the control device 100 may obtain an engine speed, a throttle opening degree and the like, estimate to calculate the negative pressure in the intake pipe on the basis of the obtained information, and use this calculated value as the negative pressure Pvbi in the intake pipe. Also, the control device 100 may include a map illustrating a relationship between a vehicle body speed of the vehicle and the negative pressure Pvbi in the intake pipe, and use a value corresponding to the vehicle body speed as the negative pressure Pvbi in the intake pipe with reference to the map.

Although the correction amount RS is maintained at the value equal to the reference correction amount RSb in the second embodiment, it is also possible to correct to decrease the correction amount RS when the negative pressure Pvb in the negative pressure chamber 51 recovers as described in the first embodiment. That is, when the negative pressure Pvb recovers, it is possible to multiply the decrease gradient $\Delta adj$ by the negative pressure change amount Pvbd to obtain the product ($=\Delta adj \cdot Pvbd$) as the decrease amount RSc, and to make a difference obtained by subtracting the decrease amount RSc from the reference correction amount RSb the correction amount RS. By using such correction amount RS, it is possible to more appropriately adjust the decrease in target increase amount Pmadj when the negative pressure Pvb recovers.

If the target increase amount Pmadj may be decreased when the negative pressure Pvb in the negative pressure chamber 51 increases during the execution of the brake assistance processing, the target increase amount Pmadj may be decreased by a method different from the method described in each of the above-described embodiments. For example, when the negative pressure Pvb in the negative pressure chamber 51 increases, the target increase amount Pmadj may be decreased with a predetermined gradient set in advance.

Timing to start decreasing the target increase amount Pmadj during the execution of the brake assistance processing may be set slightly later than timing at which the negative pressure Pvb in the negative pressure chamber 51 starts increasing.

As the hydraulic pressure generating device, a device in which a vacuum pump is connected to the vacuum booster 23 may be adopted.

The brake adjusting mechanism may be a mechanism other than the brake actuator 30 described above as long as this is a mechanism capable of adjusting the WC pressure in the wheel cylinders 11a to 11d even when the brake pedal 21 is not operated.

The invention claimed is:

1. A vehicle brake control device, comprising:
a vacuum booster which assists operation force inputted to a brake operating member in accordance with differential pressure between a negative pressure chamber and a variable pressure chamber when the brake operating member is operated;
a master cylinder in which hydraulic pressure corresponding to the operation force assisted by the vacuum booster is generated;
a wheel cylinder provided for a wheel in which inner hydraulic pressure increases as the hydraulic pressure in the master cylinder increases; and
a brake adjusting mechanism configured to adjust the hydraulic pressure in the wheel cylinder even when the brake operating member is not operated,
wherein
the vehicle brake control device is applied to a vehicle in which brake force applied to the vehicle is increased by an increase in hydraulic pressure in the wheel cylinder,
the vehicle brake control device further comprising:
an assistance control unit which performs brake assistance processing of increasing the hydraulic pressure in the wheel cylinder by a target increase amount based on assistance limit pressure by allowing the brake adjusting mechanism to operate when the vacuum booster reaches assistance limit in a situation in which the brake operating member is operated; and
a target increase amount setting unit which, when determining that emergency braking is requested from an operation mode of the brake operating member, makes the hydraulic pressure in the master cylinder at that point in time the assistance limit pressure and sets the target increase amount based on the assistance limit pressure,
the assistance control unit performs the brake assistance processing when it is determined that the emergency braking is requested,
wherein
the vehicle brake control device is configured such that, in a case where the hydraulic pressure in the master cylinder at a point in time when the vacuum booster reaches the assistance limit predicted from the negative pressure in the negative pressure chamber is made negative pressure conversion hydraulic pressure, the negative pressure conversion hydraulic pressure increases as the negative pressure in the negative pressure chamber is higher,
the vehicle brake control device comprising:
a target hydraulic pressure setting unit which increases target hydraulic pressure as a difference obtained by subtracting the assistance limit pressure from the negative pressure conversion hydraulic pressure at a point in time when it is determined that the emergency braking is requested is larger,
wherein
the target increase amount setting unit makes a difference obtained by subtracting the hydraulic pressure in the master cylinder from target hydraulic pressure set by the target increase amount setting unit the target increase amount, and
the target hydraulic pressure setting unit corrects to decrease the target hydraulic pressure when the negative pressure in the negative pressure chamber increases in a situation in which the brake assistance processing is performed.

2. A vehicle brake control device, comprising:
a vacuum booster which assists operation force inputted to a brake operating member in accordance with differential pressure between a negative pressure chamber and a variable pressure chamber when the brake operating member is operated;
a master cylinder in which hydraulic pressure corresponding to the operation force assisted by the vacuum booster is generated;
a wheel cylinder provided for a wheel in which inner hydraulic pressure increases as the hydraulic pressure in the master cylinder increases; and
a brake adjusting mechanism configured to adjust the hydraulic pressure in the wheel cylinder even when the brake operating member is not operated,
wherein
the vehicle brake control device is applied to a vehicle in which brake force applied to the vehicle is increased by an increase in hydraulic pressure in the wheel cylinder,
the vehicle brake control device further comprising:
an assistance control unit which performs brake assistance processing of increasing the hydraulic pressure in the wheel cylinder by a target increase amount based on assistance limit pressure by allowing the brake adjusting mechanism to operate when the vacuum booster reaches assistance limit in a situation in which the brake operating member is operated; and
a target increase amount setting unit which, when determining that emergency braking is requested from an operation mode of the brake operating member, makes the hydraulic pressure in the master cylinder at that point in time the assistance limit pressure and sets the target increase amount based on the assistance limit pressure,
the assistance control unit performs the brake assistance processing when it is determined that the emergency braking is requested, and
the target increase amount setting unit decreases the target increase amount as an operating speed of the brake operating member at a point in time when it is determined that the emergency braking is requested is lower and decreases the target increase amount as the negative pressure in the negative pressure chamber at the same time is higher.

3. The vehicle brake control device according to claim 2, wherein
the vehicle brake control device is configured such that, in a case where pressure obtained by converting the negative pressure in the negative pressure chamber to the hydraulic pressure in the master cylinder is made the negative pressure conversion hydraulic pressure, the negative pressure conversion hydraulic pressure becomes higher as the negative pressure in the negative pressure chamber is higher,
the vehicle brake device comprising:
an initial gain setting unit which sets a correction initial gain on the basis of the operating speed of the brake operating member at the point in time when it is determined that emergency braking is requested and the negative pressure conversion hydraulic pressure at the same point in time; and
a target hydraulic pressure setting unit which calculates a correction gain on the basis of the set correction initial gain, multiplies the correction gain by a difference obtained by subtracting the assistance limit pressure from the hydraulic pressure in the master cylinder, and makes a sum of a product and the assistance limit value a target hydraulic pressure,
wherein
the initial gain setting unit decreases the correction initial gain as the operating speed of the brake operating member at the point in time when it is determined that the emergency braking is requested is lower and as the negative pressure conversion hydraulic pressure at the same point in time is higher, and
the target increase amount setting unit makes a difference obtained by subtracting the hydraulic pressure in the master cylinder from the target hydraulic pressure set by the target increase amount setting unit the target increase amount.

4. The vehicle brake control device according to claim 3, wherein
the target hydraulic pressure setting unit corrects to increase the correction gain when the negative pressure in the negative pressure chamber increases in a situation in which the brake assistance processing is performed and calculates the target hydraulic pressure by using the correction gain corrected to increase.

* * * * *